June 24, 1958     O. SELBACH     2,840,212
DEVICE FOR POSITIONING ELONGATED OBJECTS
Filed Feb. 23, 1955     3 Sheets-Sheet 1
*FIG. 1*
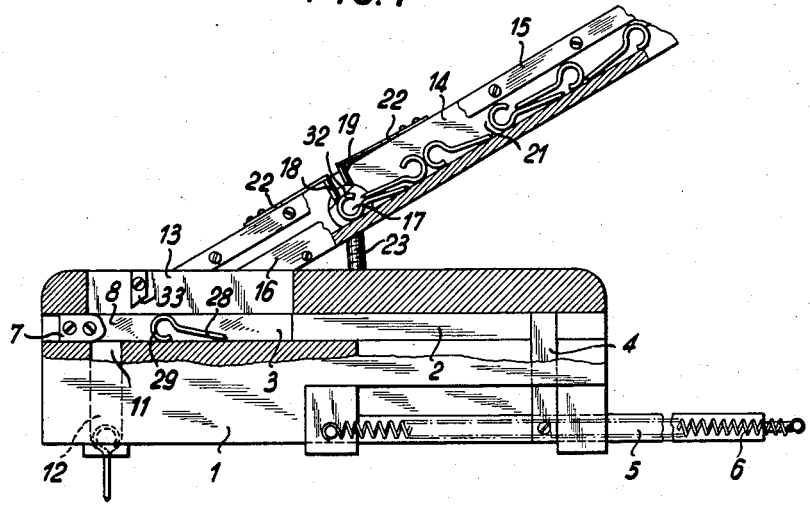
*FIG. 2*
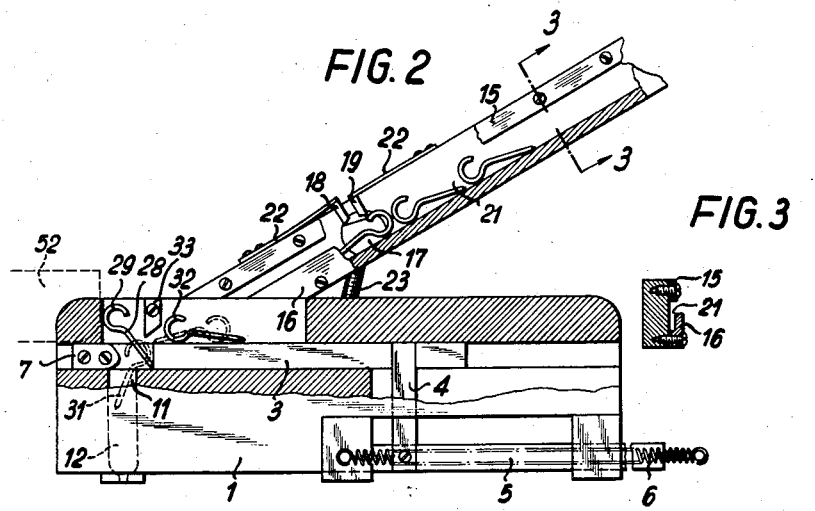
*FIG. 3*
*FIG. 4*
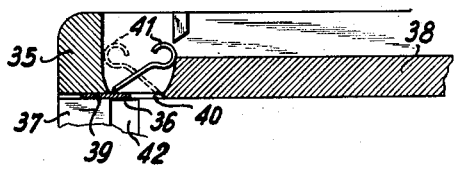
INVENTOR

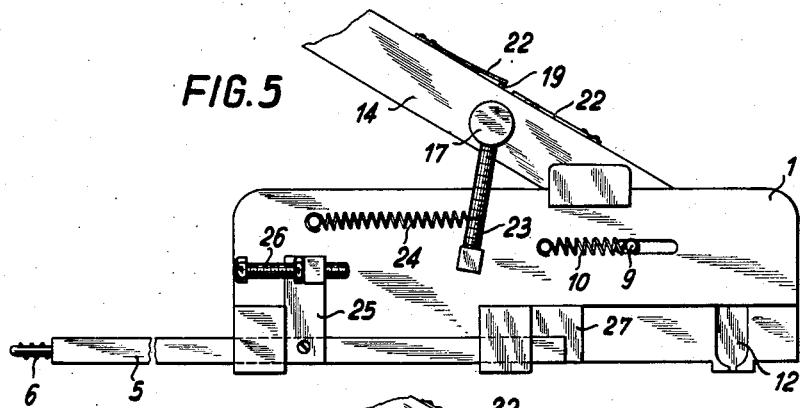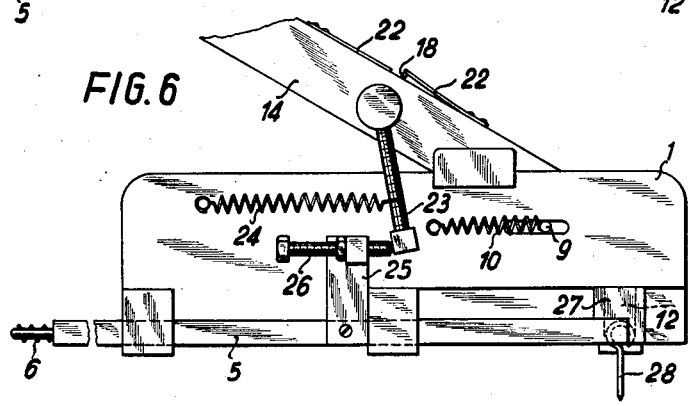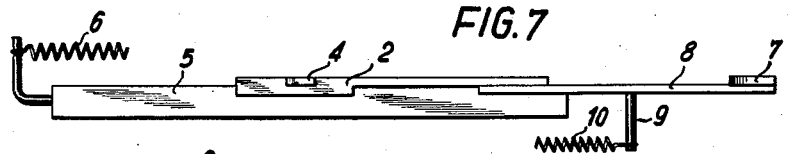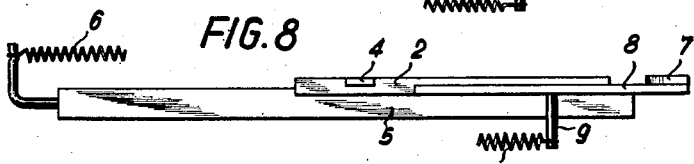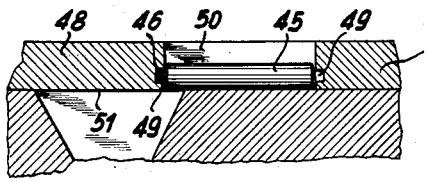

June 24, 1958  O. SELBACH  2,840,212
DEVICE FOR POSITIONING ELONGATED OBJECTS
Filed Feb. 23, 1955  3 Sheets-Sheet 3

INVENTOR
Otto Selbach

2,840,212

DEVICE FOR POSITIONING ELONGATED OBJECTS

Otto Selbach, Ludenscheid, Westphalia, Germany

Application February 23, 1955, Serial No. 490,091

2 Claims. (Cl. 193—43)

The invention relates to a device provided with a slide and a feed guide, as well as with a feed track having a stop-and-release mechanism, for positioning asymmetrical elongated objects with one end differing in conformation from the other.

Small mass-production parts, for example hooks, eyes and the like, that are produced on one automatic machine and are to be further processed by another likewise automatic machine, for example a thread cutting machine, are as a rule fed to the latter machine by hand, in the absence of a suitable fixture for positioning the objects. This work is of course time-consuming and costly, as the objects cannot be fed by hand at the speed of operation of a machine, so that this operation adds materially to the cost of the products.

There is a known device for positioning screw eyes, wherein a pin engages the eye of a piece fed from a magazine along a track and brings the piece over a trap above which it is caused to hang shank-down by the weight of the shank. However, this device serves only for screw eyes, and cannot be used, for example, for screw eyes with open ring, screw hooks, setscrews and the like. It also has the disadvantage that the depending shank makes the piece swing back and forth, and this motion must subside before feeding to the thread cutter. This considerably impairs the speed of operation of the machine. Still other devices are known by means of which parts taken from a magazine can be fed to a machine in positioned condition, but these are even more complicated and slower in operation.

The present invention addresses itself to the problem of providing a device for positioning of objects that is to be simple in construction, reliable in operation, serviceable for several different objects, and substantially higher in speed than known devices.

This problem is solved substantially in that a slide and feed guide grasp the object while the trap is closed, and are provided on their opposing surfaces with curves, projections, depressions and the like for guiding and catching the objects so that the latter, their ends being different from each other, are caught at one end and let slip at the other, with the result that all the objects drop with like ends foremost into a feed chamber which opens after each object is grasped by the slide and feed guide.

A preferred embodiment is characterized substantially in that the feed guide is slidably mounted over the trap and, after the object has been brought up by the slide against the force of a restoring spring, is displaceable in common with the slide until the space between slide and guide piece is over the trap.

Particular embodiments of the positioning tools are substantially characterized in that the feed guide obstructing the track and/or the feed slide have their mutually facing surfaces curvilinear in form in such manner that the object slips on the said faces out of a horizontal position into a substantially vertical position as required, from which, after the space between feed guide and slide has been shifted over the feed chamber, and after being positioned with respect to the preceding parts, it drops through the trap into the feed chamber, and in that the mutually facing surfaces of the feed guide and slide obstructing the trap are provided with recesses which are engaged by one of the asymmetrical ends of the elongated object so that the said feed guide and slide grasp the object in horizontal position and carry it over the trap, through which the object drops vertically into the feed chamber with that end foremost which does not engage such a recess; as well as in that the feed guide is in fixed location behind the trap and the slide is provided with a blade having a window which, when an object is being fed in, shuts off the trap to the feed chamber, while the window in the blade is shut off from below by the block, so that the object rises between the suitably curved feed guide and the slide, and drops into the feed chamber in positioned condition only after the window in the blade of the slide has been placed over the trap to the feed chamber, the blade of the slide advantageously passing under the feed guide; in that the feed guide, rotatable against the action of a restoring spring, is attached to a sliding part displaceable by the said slide, and a stop is provided in the trap which, when struck by the feed guide, turns the horizontal feed guide obstructing the trap into vertical position and exposes the trap.

A further feature of the device is characterized in that the slide is attached by a push-rod to a restoring spring which draws the slide into its terminal forward position and, by way of the push-rod, winds up the restoring springs on the feed guide and the locking mechanism provided in the feed track, so that all operative movements of the device are executed by means of springs, while only the idle return stroke of the slide need be powered.

A special feature of the feed from a magazine to the device is substantially characterized in that interchangeable gibs are mounted in a track adapted to each shape and size of object.

A particularly advantageous device for controlled individual feed of pieces into the operating space is characterized in that the feed track is provided with an eccentric driven by a rider on the push-rod striking a pin on the eccentric and by a spring acting against the same but weaker than the thrust of the push-rod, which eccentric actuates two pins alternately entering the feed track under spring action.

Finally, another feature of the invention is characterized in that the push-rod is provided with a plate laterally obstructing the feed chamber after entry of the push-rod.

A device for positioning of objects according to the present invention is adaptable to a considerable number of different products, by replacement of only a few single components, while the structure of the device is extremely simple. It permits a considerably higher speed of operation as compared to known devices. The fact that the operating stroke is driven by spring action renders the device exceedingly trouble-free, as it will stop immediately if anything goes wrong.

The device according to the invention will now be more fully described with reference to the accompanying drawings, but it should be understood that these are given by way of illustration and not of limitation and that many changes in the details may be made without departing from the spirit of the invention. As an example, a feed-device for a thread cutting machine is shown.

In the drawings,

Fig. 1 shows an embodiment of the device in front view, in partial section;

Fig. 2 shows the same embodiment in front view, in partial section, in a different operating position;

Fig. 3 shows a section 3—3 (Fig. 2) of the feed track;

Fig. 4 shows a portion of the device with another embodiment of working parts;

Fig. 5 shows a back view of the device in the position of Fig. 1;

Fig. 6 shows a similar back view, with push-rod thrust in completely;

Fig. 7 shows the action of Figs. 1 and 5, in top view;

Fig. 8 shows the action of Fig. 6, likewise in top view;

Fig. 9 shows still another embodiment of working parts;

Figure 10:
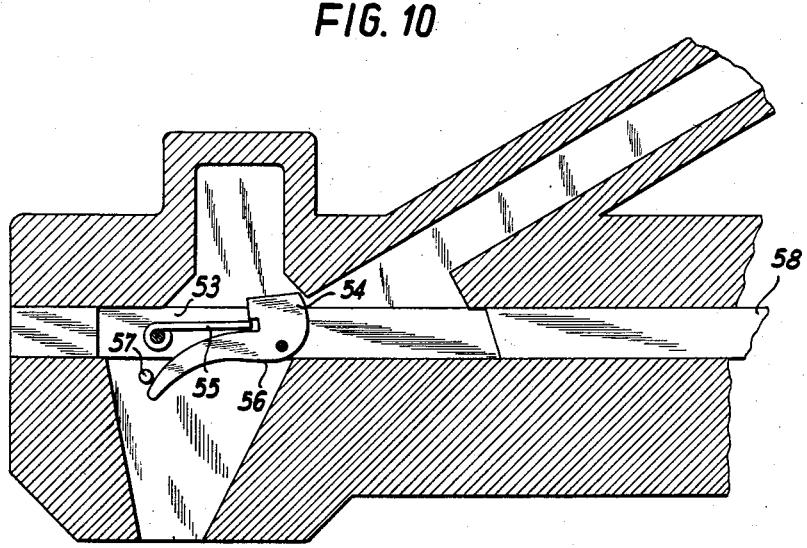
Figs. 10 and 11 show another embodiment of a positioning mechanism, in two different positions.

In a block 1, a slide 2 is mounted in a track 3. The slide 2 is joined by an arm 4 to a push-rod 5, likewise mounted in the block 1. The push-rod is continually being drawn into the block 1 by a spring 6. At the end of a first feed track 3, a feed guide 7 is provided, connected to a slide 8. A pin 9 (Fig. 5) on slide 8 projects through the rear wall of the block 1. A spring 10 is hooked on pin 9, drawing slide 8 and with it the feed guide 7 towards the slide 2. In this position, feed guide 7 partly obstructs a trap 11 leading to a feed chamber 12. Above the chamber 13 of block 1, the latter is fitted with a second downwardly depending feed track 14 on which gibs 15, 16 (Fig. 3) are loosely and replaceably attached. The feed track 14 is provided with an eccentric 17 which actuates pins 18, 19 interposed in the feed track 21 and subject to the action of leaf springs 22. Eccentric 17 is equipped with a swinging pin 23 continually held by a spring 24 against the direction of entry of the push-rod 5. The push-rod 5 carries a traveler 25 with setscrew 26, which strikes pin 23 when rod 5 is thrust in. A plate 27 at the end of the push-rod 5 shuts off the feed chamber 12 when the push-rod 5 is thrust in.

The device operates as follows. A horizontal eye 28 (Fig. 1) dropping into chamber 13 from feed track 14 is struck by slide 2, driven by spring 6, and run up towards feed guide 7 (Fig. 2). If the annular head 29 of the eye 28 strikes the feed guide 7, it rises along the upward curve, whereas if the shank 31 first strikes the feed guide 7 (dotted position), the shank 31 drops downward, while the head 29 continues to be held between slide 2 and feed guide 7. In this position of the device, the traveler 25 with screw 26 has turned the eccentric 17 by means of pin 23 to such an extent that pin 18 is raised and allows the next eye 32 to drop into the chamber 13, where it strikes a stop 33 and rests on the slide for the time being. In this position, pin 19 has dropped and holds back the following eye (Fig. 2). Upon further advance, slide 2 and feed guide 7, unchanged in spacing relative to each other, bring eye 28 over trap 11 where it drops vertically into feed chamber 12 (Fig. 6; for slide position, see Fig. 8). In this position, plate 27 shuts off the feed chamber. Push-rod 5, which may advantageously be connected to the thread-cutting machine to which the eyes are to be fed, and synchronized with its operating speed, is withdrawn from the position of Figs. 6 and 8 and wound up again. As a result, plate 27 opens feed chamber 12 and releases eye 28, which upon opening of the chamber may be picked up by a slide and fed to the thread-cutting machine. The device, after withdrawal of push-rod 5 and winding of spring 6, resumes the position of Figs. 1, 5, with slide position as in Fig. 7. The eye 32 resting on slide 2 is stripped off and drops into feed track 3.

In the embodiment of working parts represented in Fig. 4, the feed guide 35 is located behind the trap 36 and integral with the block 37. The slide 38 is provided with a blade 39 having a window 40. Slide 38 brings the eye 41 in front of feed guide 35, much as in Fig. 2, while eye 41, depending on its position, will climb up either the feed guide 35 or the slide 38, and after further advance of slide 38, whereby the blade 39 passes under feed guide 35 and the window 40 in blade 39 comes above the trap 36 in block 37, drops vertically into the feed chamber 42.

Fig. 9 shows working parts for positioning a cylindrical pin 45 with projection 46 at one end, used for example for manufacturing setscrews. Both slide 47 and feed guide 48 are provided with recesses 49 which can be engaged by a projection 46 on pin 45. Pin 45 is brought up to feed guide 48 by slide 47, and, depending on its position, engages one of the recesses 49. The feed guide 48 is attached to a slide 50 which in the position of Fig. 9 is engaged by slide 47, so that upon further advance, feed guide 48 and slide 47 move without change in their position relative to each other. When pin 45 has been brought over the trap 51, its projectionless end drops and falls into the feed chamber. It remains to note that the feedtrack 14 is readily accessible through the slit between gibs 15, 16, and the chamber 13 through a swinging coverplate 52, so that if anything goes wrong, the track of the object can be inspected without detaching any part of the device.

Figure 11:
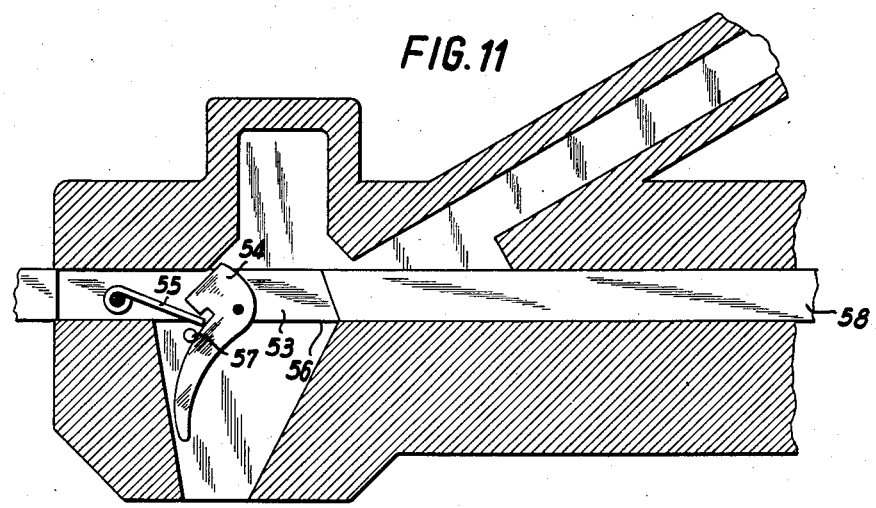

In Figs. 10 and 11, on a sliding part 53, a feed guide 54, rotatable against the force of a restoring spring 55, is mounted. The feed guide 54 shuts off the trap 56 in the initial position of the slide 58. Upon advance of slide 58, it moves sliding part 53 so that the feed guide 54 travels up a stop 57 provided in the trap, turns from horizontal to vertical position against the force of spring 55, and exposes the discharge opening.

What I claim is:

1. Device for positioning asymmetrical elongated objects having one end different from the other, comprising a block member formed with a first horizontally extending feed track and having a trap communicating with said feed track, a horizontally displaceable feed guide for said objects displaceably mounted over said trap, a slide member horizontally displaceable on said feed track with respect to said feed guide, said feed track, said feed guide and said slide member forming a chamber for aligning said object, tension means normally maintaining said feed guide over said trap, and means for periodically displacing said slide member and said object against said feed guide and the force of said tension means, whereby said feed guide is temporarily displaced from over said trap, thus opening the latter, and the said object is propelled by said slide member into the trap opening thus formed.

2. Device for positioning asymmetrical elongated objects having one end different from the other, comprising a block member formed with a first horizontally extending feed track and having a trap communicating with said feed track, a horizontally displaceable feed guide for said objects displaceably mounted over said trap, a slide member horizontally displaceable on said feed track with respect to said feed guide, said feed track, said feed guide and said slide member forming a chamber for aligning said object, tension means normally maintaining said feed guide over said trap, means for periodically displacing said slide member and said object against said feed guide and the force of said tension means, whereby said feed guide is temporarily displaced from over said trap, thus opening the latter, and the said object is propelled by said slide member into the trap opening thus formed, a second feed track, an eccentric in said feed track, a push-rod provided with a traveller element, a pin on which said eccentric is mounted, tension means normally maintaining said push-rod and said eccentric in retracted position, a plate member associated with said push-rod for laterally shoving off said chamber upon entry of the push-rod.

References Cited in the file of this patent

UNITED STATES PATENTS

| 639,431 | Pondorf | Dec. 19, 1899 |
| 676,761 | Morris | June 18, 1901 |
| 1,658,428 | Charles | Feb. 7, 1928 |
| 2,377,154 | Hurley | May 29, 1945 |
| 2,427,712 | Casler et al. | Sept. 23, 1947 |
| 2,570,903 | Yost | Oct. 9, 1951 |
| 2,713,930 | Koch | July 26, 1955 |